(12) United States Patent
Gainsboro et al.

(10) Patent No.: US 9,008,290 B1
(45) Date of Patent: Apr. 14, 2015

(54) METHOD AND APPARATUS FOR INCREASED CALL REVENUE COLLECTION

(71) Applicant: Jay Gainsboro

(72) Inventors: Jay Gainsboro, Framingham, MA (US); Lee Weinstein, Arlington, MA (US)

(73) Assignee: Subscriber Solutions, Inc., Framingham, MA (US)

( * ) Notice: Subject to any disclaimer, the term of this patent is extended or adjusted under 35 U.S.C. 154(b) by 0 days.

(21) Appl. No.: 14/243,307

(22) Filed: Apr. 2, 2014

(51) Int. Cl.
  *H04M 17/00* (2006.01)
  *H04M 15/00* (2006.01)
(52) U.S. Cl.
  CPC .......... *H04M 15/8278* (2013.01); *H04M 15/88* (2013.01); *H04M 17/106* (2013.01); *H04M 2017/12* (2013.01)

(58) Field of Classification Search
  USPC .......................... 379/114.19, 114.23, 114.21
  See application file for complete search history.

(56) References Cited

U.S. PATENT DOCUMENTS

2007/0263812 A1* 11/2007 Polozola et al. ......... 379/144.02
2009/0228383 A1*  9/2009 Martinez et al. ................ 705/35

* cited by examiner

*Primary Examiner* — Creighton Smith
(74) *Attorney, Agent, or Firm* — Lee Weinstein

(57) ABSTRACT

A call revenue enhancement system for a prison telephone system allows prisoners to make and initial call to a dialed number, and automatically prompts the called party to set up a credit card to be billed for future calls from the inmate. Additional phone numbers may also be specified to which the inmate may make calls which will be automatically charged to the credit card provided by the called party.

1 Claim, 1 Drawing Sheet

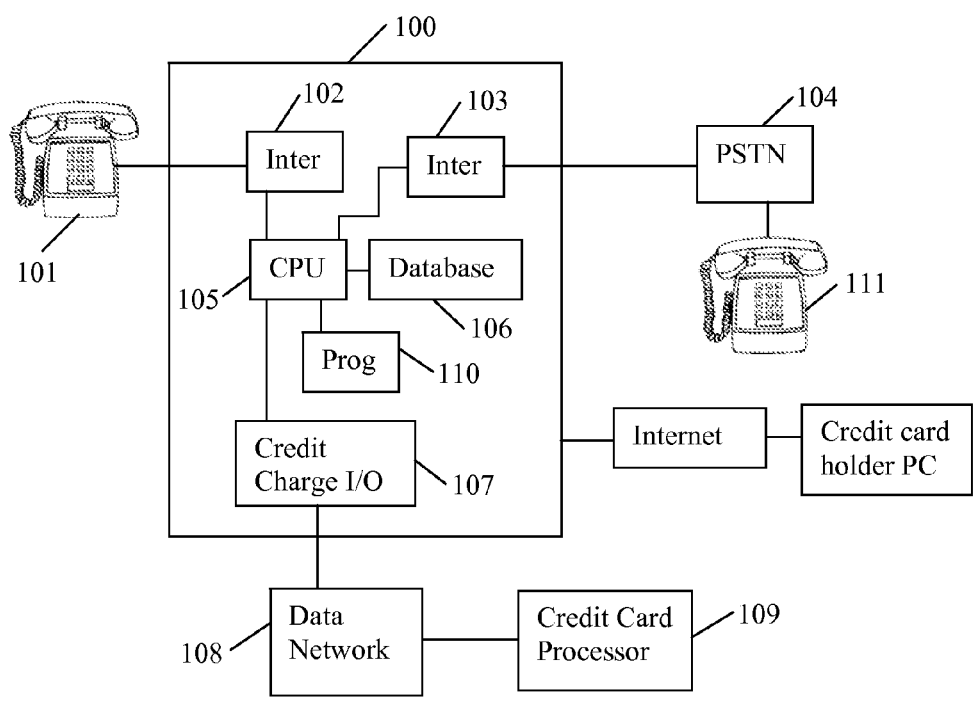

METHOD AND APPARATUS FOR INCREASED CALL REVENUE COLLECTION

CROSS-REFERENCE TO RELATED PATENT APPLICATIONS

This patent application is related to U.S. patent application Ser. Nos. 11/475,541 and 12/284,450, and provisional patent applications 61/281,043, 61/380,325, 61/413,901, and 61/339,497, all of which are herein incorporated by reference.

FIELD OF THE INVENTION

The field of the invention relates to prison phone systems, collect calling systems, and more specifically to automated billing systems for calls placed by prisoners in prisons.

BACKGROUND OF THE INVENTION

Millions of telephone calls are placed from United States prisons each week, and collecting money for those phone calls can be challenging for companies that operate prison phone systems. One way that inmates are typically allowed to pay for phone calls is by placing collect phone calls. In a typical calling scenario, to place a collect phone call, an inmate identifies himself or herself (typically by a personal identification number (PIN) and perhaps also through biometric identification), and then enters the phone number to which a collect call is to be placed. Provided the system is programmed to allow that inmate to call that number, a call is placed, and an automated voice response system in the prison phone system enunciates a voice query, asking if a collect call from the inmate will be accepted. If the call recipient accepts the collect call, the inmate is connected to the called party.

There are two problems with using the established telephone company collect call billing methods as revenue collecting methods for phone calls placed from prisons. The first problem is that compared to calls placed by an average cross-section of the public, a much higher percentage of inmate phone calls are made to persons who are financially irresponsible. It is not uncommon for an inmate to place a month worth of collect phone calls to an individual, and for that individual to cancel his or her phone service, switch to a different phone provider, and not pay his or her bill for the collect calls. In such a case, the company operating the prison phone system winds up unable to collect funds for those phone calls. There is a need for innovative billing systems which allow companies which operate prison phone systems to collect revenues for a higher percentage of phone calls placed by inmates.

Because the probability of uncollectible funds is higher in the beginning when no collection record has been established with a particular called party, some prison phone systems limit the monthly dollar volume of collect phone calls to a particular number until a payment history has been established. There is a need for innovative revenue collection systems which do not necessitate limiting collectable revenues by limiting calling time.

A further problem with using existing collect-call billing systems to collect revenues for phone calls placed by inmates is that a growing number of phone calls placed by inmates are to cell phones, and cell phone companies do not offer collect call revenue collection services. Thus, telephone calls from inmates to cell phones cannot be placed as collect calls.

Prison phone system providers such as Securus Technologies have developed billing systems which allow credit-card-billed accounts to be set up which can be used as a source of funds for inmate phone calls. Thus a family member of an inmate can fund phone calls that the inmate makes, including phone calls to cell phones. The average collectability of charges for phone calls made with such a billing system has been shown to be substantially higher than the average collectability of collect phone calls placed by inmates (typical 10% bad debt for collect calls vs. 1% bad debt for pre-paid calls). In addition, the funds collected through such a system are subject to only the typical 2% transaction fees of credit card companies, rather than the typical 5% to 7% transaction fees charged by phone companies for collecting collect-call revenues.

In order to facilitate inmates placing phone calls to persons who are only (or primarily) reachable by cell phone, prison phone systems available from Securus Technologies allow inmates to place a limited number of brief free phone calls to cell phone numbers (which cannot accept collect calls). An automated voice message is played to the call recipient, encouraging the call recipient to stay on the line after the free inmate call ends, to sign up for a credit-card-funded account which the calling inmate can used to fund future calls to that cell phone number.

There is a need for innovative methods and apparatus which facilitate prison phone service providers collecting a higher percentage of billable revenues, and paying lower transaction fees.

SUMMARY OF THE INVENTION

In one aspect, the present invention allows persons with credit cards to establish called-party-specific accounts which can automatically be billed for phone calls placed by a specific inmate to one or more specific phone numbers. Thus if Joe is an inmate, his girlfriend Ann can set up an account which is automatically billed for any phone calls Joe places to Ann's cell phone or Ann's home phone, but not to any other phone.

In another aspect the present invention encourages call recipients (by way of automated voice marketing offers) to establish credit-card-funded calling accounts for inmates rather than accepting collect calls. This shifts a higher percentage of calls placed by inmates to a higher-collectability system and a lower-transaction-fee system, thus increasing revenues for prison phone system companies in two ways.

BRIEF DESCRIPTION OF THE DRAWINGS

FIG. 1 is a block diagram of the hardware of a preferred embodiment of the present invention.

DETAILED DESCRIPTIONS OF SOME PREFERRED EMBODIMENTS

When an inmate places a collect call from a prison phone system equipped with the present invention, rather than just voice-prompting the call recipient to accept the collect call, the system also plays a voice message to the call recipient, informing him or her of a financial incentive which may be realized by signing up for a credit-card-funded account which would be used to fund calls from the calling inmate to the call recipient.

A preferred embodiment of the present invention tracks inmate calling behavior over time, including numbers dialed, frequency of calls to each number, typical amount of time on the phone to each number dialed (per call, day, week, and month), etc. In a preferred embodiment, the financial incentive offered for signing up for a credit-card-funded phone account is automatically derived from past inmate calling behavior. In a preferred embodiment, the financial incentive may be either a lower per-minute rate, or some free call minutes up-front, or both. In a preferred embodiment, the incentive may also include a drastically reduced rate for the present phone call if the call recipient completes the sign-up process at the end of the phone call or directly following the phone call. In a preferred embodiment, the call recipient is given an opportunity to respond "yes" either by voice or by pressing a digit on the telephone keypad, to schedule the sign-up process to take place at the end of the phone call.

In a preferred embodiment, if the call recipient chooses to sign up for the called-number-specific call-funding account, then the collect-called number is saved by the present invention, and as soon as the phone call between the call recipient and the inmate is finished, the present invention automatically directly dials the phone number to which the inmate previously placed a collect call. The present invention then uses voice prompts to lead the call recipient through the sign-up process, during which the call recipient provides his or her credit card number. In one aspect, the present invention provides for automatic recurring billing of a credit card each time the called party's inmate-call-funding account drops below a certain amount. In another aspect, the present invention allows the call recipient to manually transfer funds into the call-funding account through a voice-prompted telephone interface (for instance in response to a voice prompt stating that the account will be depleted in a specified number of minutes), or through an interface available over the Internet.

In a preferred embodiment, the call recipient may specify additional phone numbers which the inmate may call using the dialed-number-specific account, and a detailed statement of calls billed to each number is made available to the called party each month over the Internet, or on a mailed paper account statement, or both. In a preferred embodiment where an account has been configured to fund calls to more than one phone number that a specific inmate may dial, the present invention allows the person funding the account to limit the dollar volume of calls made using the account by the inmate per day to a particular individual and/or week and/or month. The present invention also allows an account to be set up such that e-mail or phone messages will automatically be sent to the person funding the account when certain calling conditions are met (for instance, when the inmate dials a specific number the account is configured to fund inmate calls to).

In a preferred embodiment, the present invention includes a database (which tracks the metrics listed above), an automated credit card billing system, and automated outbound calling system, a web server allowing customers who fund calling accounts control of accounts they funded and access to data about those accounts, an automated condition detection system, and a condition-specific automated action system.

FIG. 1 is a block diagram of the hardware of a preferred embodiment of the present invention. Call control system 100 includes prison phone line interface 102 (which connects to prison phone 101), outgoing line interface 103 (which connects to the public switched telephone network (PSTN) 104, CPU 105, program memory 110, database 106, and credit charge data interface 107 (which connects through external data network 108 to credit card processor 109). In a preferred embodiment, CPU 105 executes instructions from program memory 110 to play verbal prompts to an inmate using phone 101 to make a call, prompting the inmate to enter identifying information, which is checked against identifying information in database 106, and in some cases performing biometric identification as well (for instance by voiceprint). Once identifying information has been presented, the inmate dials a number and CPU 110 checks database 106 to see if the number dialed is a credit-card-funded number for that inmate. If the number being dialed is a credit-card-funded number for that inmate, a pre-charge is made to the credit card if needed and the inmate is connected to the number dialed. During or after the phone call, additional charges to the credit card may be placed through charge data interface 107, data network 108, and credit processor 109.

In a preferred embodiment, if no attempt has been made in the past to set up a credit card account to bill calls fro the inmate to the number dialed, the inmate will be connected briefly to the number dialed and the person at the number dialed will be automatically prompted in voice prompts to indicate whether a credit number will be provided to charge calls accepted at that dialed number form the inmate. If the dialed party at phone 111 enters credit card charge data sufficient to charge calls from the inmate, CPU 105 automatically stores that credit card charge data in database 106 so that the current call and future calls from the inmate to that dialed number may be charged to that credit card. Additional voice prompts may offer the dialed party the opportunity to specify additional phone numbers the inmate may dial and have calls to those numbers charged automatically to the credit card. In a preferred embodiment, the party providing the credit card information is also automatically prompted to provide a charge limit, beyond which further approval of the credit card holder will be sought before charging additional calls. In a preferred embodiment, the called party may be prompted to enter on the phone (for instance through an interactive voice response interface) an e-mail address to which a summary of each call the inmate places will automatically be e-mailed of made available on a web-accessible account which may be accessed by the credit card holder.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The invention claimed is:

1. A call revenue enhancement system, comprising: means allowing a prison inmate to place an initial call to a call recipient;
   means for automatically presenting to said call recipient during said initial call an opportunity to provide credit card information to fund future calls to said call recipient from said inmate;
   means for automatically billing future phone calls from said inmate to said call recipient to said credit card; and
   means for automatically prompting said call recipient to enter additional phone numbers to which said inmate may place calls and have said calls charged to said credit card.

* * * * *